Aug. 25, 1964

K. HEESEMANN 3,145,509

CONTROLLING DEVICE FOR AUTOMATIC MACHINES
ESPECIALLY WOODWORKING MACHINES

Filed July 11, 1961

INVENTOR

Karl Heesemann

BY
Lowry & Rinehart

ATTYS.

Aug. 25, 1964

K. HEESEMANN 3,145,509

CONTROLLING DEVICE FOR AUTOMATIC MACHINES ESPECIALLY WOODWORKING MACHINES

Filed July 11, 1961

INVENTOR

Karl Heesemann

By Lowry & Rinehart

ATTYS.

Aug. 25, 1964

K. HEESEMANN 3,145,509

CONTROLLING DEVICE FOR AUTOMATIC MACHINES
ESPECIALLY WOODWORKING MACHINES

Filed July 11, 1961

INVENTOR

Karl Heesemann

By

Lowry & Rinehart

ATTYS.

United States Patent Office 3,145,509
Patented Aug. 25, 1964

3,145,509
CONTROLLING DEVICE FOR AUTOMATIC MACHINES ESPECIALLY WOODWORKING MACHINES
Karl Heesemann, 54 Friedenstrasse, Rehme, Via Bad Oeynhausen, Germany
Filed July 11, 1961, Ser. No. 123,306
5 Claims. (Cl. 51—141)

This invention relates to a controlling device for automatic machines, especially woodworking machines.

In machines of this type it is frequently necessary to control the movements of one or more tools, machining a moved workpiece, or other mechanisms such as arrangements for holding the moved workpiece, in dependency upon the feed time of the workpiece moving through the machine along a predetermined path.

Where limit switches or the like cooperating with a timing relay have been provided in such machines, the objection arises that these limit switches control the movements only for a previously set period of time, that is after a limit switch or the like has been actuated this limit switch is switched off after the accurately set period of time has elapsed and thereby the movements of the tool, holding device or the like, are interrupted.

As long as the feed speed of all the workpiece to be worked is constant, these simple time switching arrangements are sufficient. In the case of machines, however, in which the feed speed of the workpieces varies, especially infinitely, the time in which a workpiece covers its path also changes. However, in order to maintain the motional action exactly from the sending of an impulse (from the switching on of the controlling device) up to the commencement of the working operation and until the end thereof, the feed or passage time of the workpiece must be accurately regulated since the path, as is known, is the product of time multiplied by speed. The controlling device must consequently control the movements in accordance with the feed speed.

It is the object of the invention to provide a controlling device on automatic machines, especially woodworking machines, for the control of movements which depend upon the passage of a workpiece, which comprises means arranged to operate in the range of movement of the workpiece, and a time switch arrangement with switches for controlling the movement stages of said means automatically in dependence upon varying passage speeds of the workpiece.

A mechanical control element for actuating the switches of the time switch arrangement may be provided, which control element is coupled on the one hand with at least one abutment roller for the passing workpiece and on the other hand with means for feeding the workpiece.

At least one shifter rod, shift lever, trip wheel or the like trip means may be used as mechanical control element and have a contacting member arranged alternately to actuate make-and-break switches for the arrangement controlling the movement stages.

In particular, at least one shifter rod may be provided as mechanical control element for cooperation with a friction wheel coupled with the means for feeding the passing workpiece.

In addition, at least one abutment roller actuable by the passing workpiece may serve to act on a coupling arrangement for coupling the shifter rod with the friction wheel.

Such a controlling device possesses the important advantage that the working and other motional actions in the region of the passing workpiece are switched exactly in time with the speed of feed, Any infinite alteration of the speed of feed is automatically taken into consideration by the controlling device and influenced according to the motional actions.

A preferred embodiment of the invention will now be described in connection with an automatic band grinding machine by way of example and with reference to the accompanying schematic drawings, in which.

Figure 1:
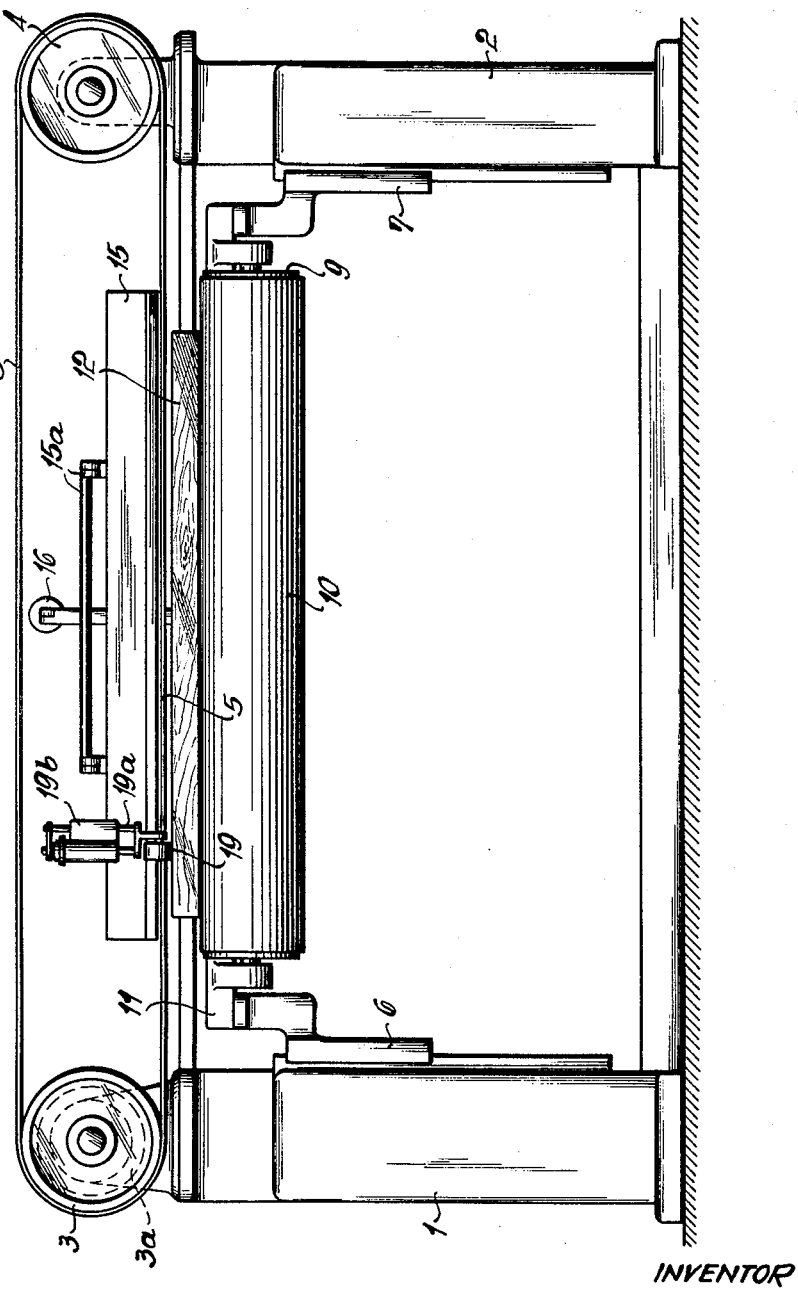
FIG 1 is a front elevational view of an automatical band grinding machine with an endless grinding band and a pressure beam movable between the strands thereof for pressing the lower strand of the grinding band onto the workpiece.
Figure 2:
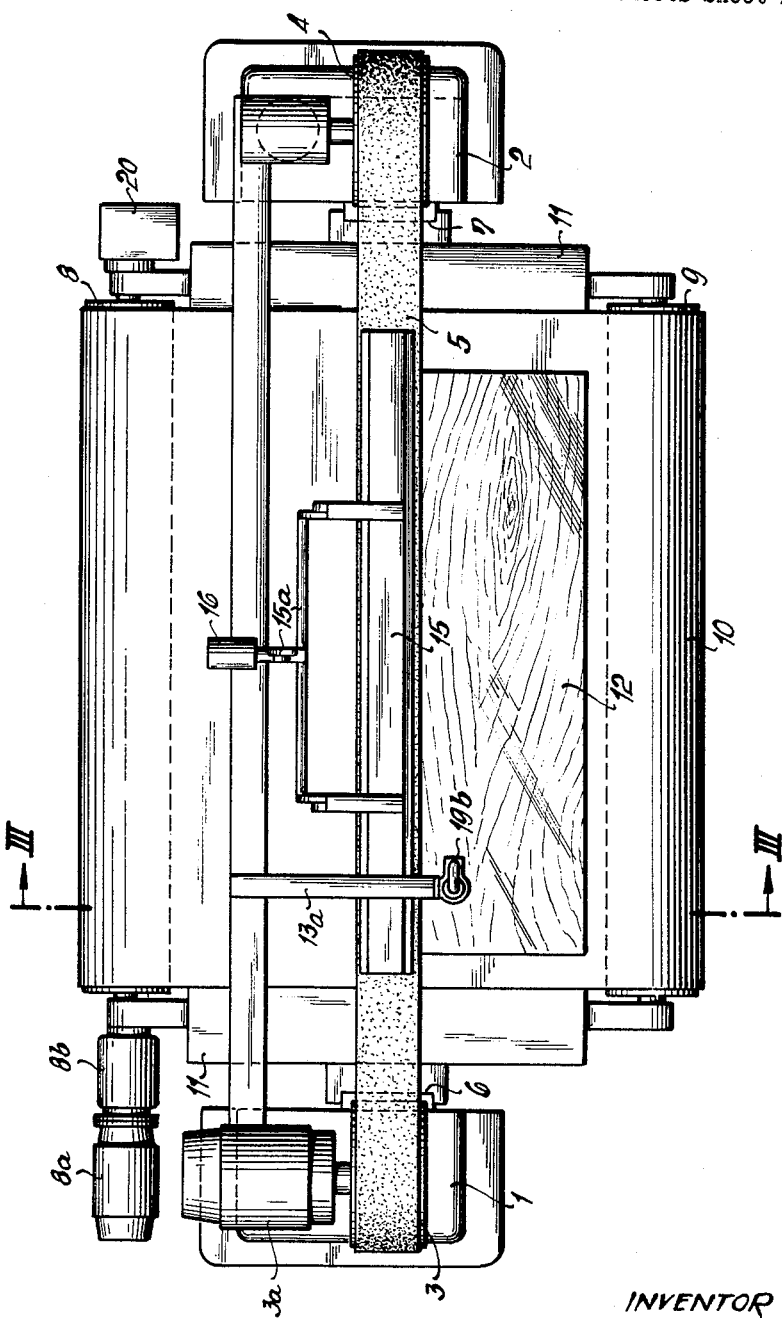
FIG. 2 is a top plan view of the machine illustrated in FIG. 1.

FIGS. 1 and 2 show an automatic band grinding machine with two band pulleys 3 and 4 mounted in uprights 1 and 2, the pulley 3 being arranged to be driven by a motor 3a. An endless grinding band 5 is led around the two band pulleys 3 and 4.

Rise and fall rests 6 and 7 are mounted on the uprights 1 and 2 and carry a rear cylinder 8 and a front cylinder 9, the rear cylinder 8 being driven by a motor 8a through the intermediary of an infinitely variable gear 8b. An endless conveyor band 10 is led around these cylinders 8 and 9 to carry a workpiece 12 in the direction of the arrow, shown in FIG. 3, under the lower strand of the endless grinding band 5. There is an intermediate table 11 under the upper strand of the conveyor band 10.

Above the lower strand of the grinding band 5 a pressure beam 15 is movably mounted which can be raised and lowered by a pressure medium cylinder 16 with piston through the intermediary of lever arms 15a. This pressure beam 15 presses the grinding band 5 against the passing workpiece 12 in order to grind the same.

In order to control the movements of the pressure beam 15 and consequently the perfect grinding according to the infinitely variable passage speed of the workpiece 12, a device is provided which is constructed and operates in the manner hereinafter described.

Figure 3:
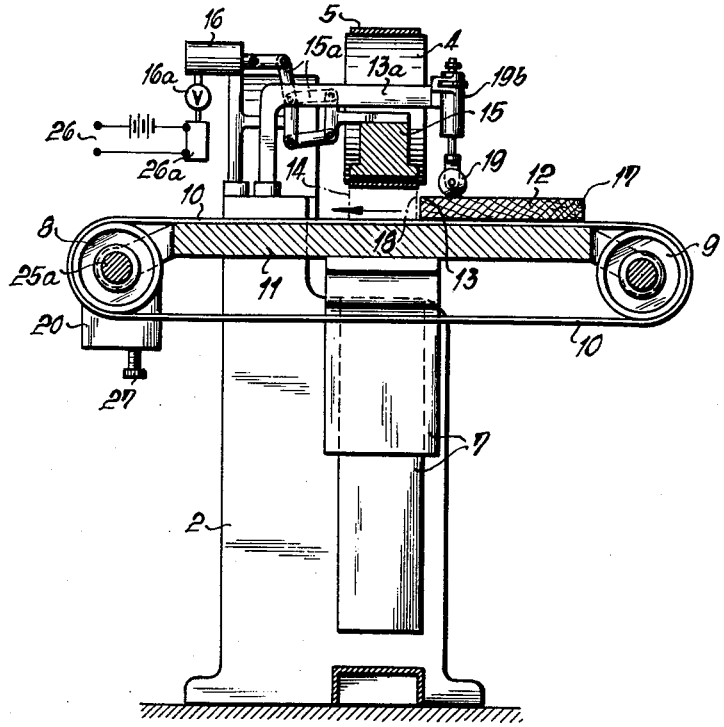
FIG. 3 is a vertical section taken on line III—III of FIG. 1.
Figure 4:
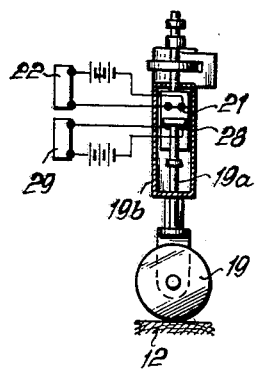
FIG. 4 is a side elevational view, on an enlarged scale, of an abutment roller with partial section through the switching device.
Figure 5:
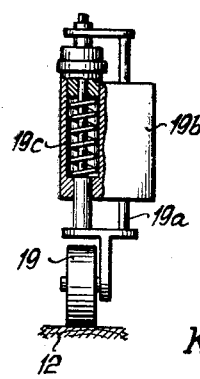
FIG. 5 is a front elevational view of the abutment roller shown in FIG. 4 with partial section through the roller guide.
Figure 6:
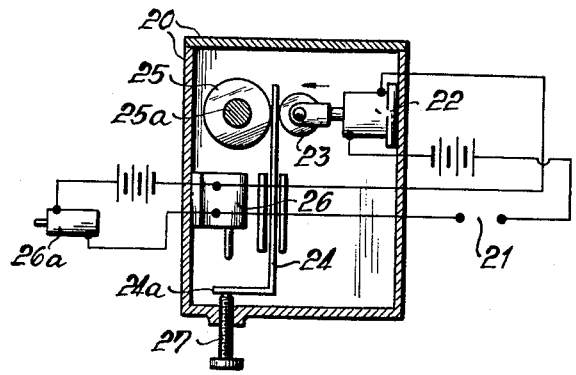
FIG. 6 is a vertical section through the mechanical part of the controlling device.
Figure 8:
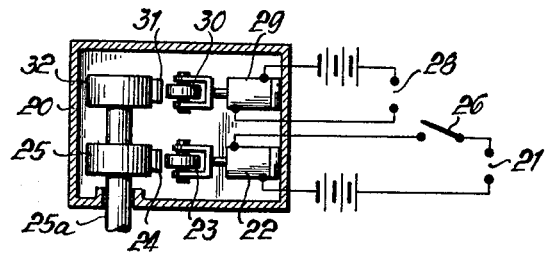
FIG. 8 is a top plan view of the controlling device shown in FIGS. 6 and 7.
Figure 7:
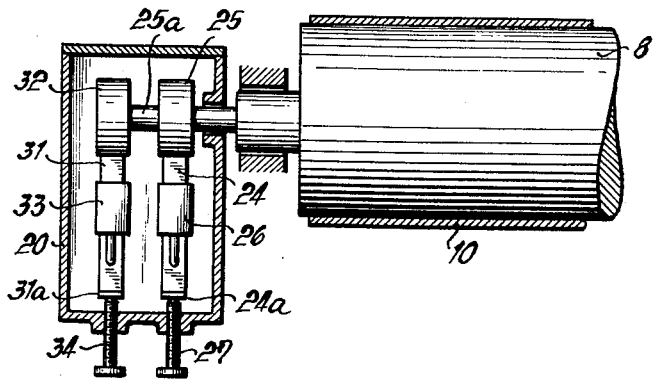
FIG. 7 is a vertical section displaced through an angle of 90° in relation to FIG. 6.

As shown in FIGS. 1 and 3, a vertically shiftable abutment roller 19 projects into the feed range of the workpiece 12 on the conveyor band 10, The abutment roller 19 is mounted at the free end of a stationary arm 13a and acted upon by a compression spring 19c shown in FIG. 5. As soon as the front edge 13 of the workpiece 12 comes into contact with this abutment roller 19 and pushes it upwardly against the action of the compression spring 19c, a guide rod 19a (FIGS. 4 and 5) connected with the abutment roller 19 and slidable in a housing 19b closes the circuit of an electromagnet 22 by means of a contact 21 shown in FIG. 4. The electromagnet 22 is arranged with other controlling devices in a housing 20 as shown in FIGS. 6 to 8, underneath the conveyor band 10. The electromagnet 22 moves forward a pressure roller 23 (FIG. 6) which presses a vertically slidable shifter rod 24 against a friction wheel 25. This friction wheel 25 is positively coupled with the cylinder 8 by means of a shaft 25a and consequently rotates according to the feed speed of the conveyor band 10 moved by the cylinder 8.

As shown in FIG. 6, the shifter rod 24 rests in its lowered position with a trip finger 24a on a set screw 27

(screw spindle) and in its upper position the trip finger 24a of the shifter rod 24 strikes against an overlying actuating plunger of a limit switch 26 which closes the circuit of an electromagnet 26a which controls a valve 16a arranged on the upstream side of the pressure medium cylinder 16. To this end the shifter rod 24 is raised from its lower position by the friction wheel 25. It consequently moves upwardly at a speed which is absolutely in proportion to the feeding speed of the conveyor band 10 since the wheel 25 moves with cylinder 8. When the limit switch 26 is actuated by the trip finger 24a, the circuit of the electromagnet 26a of the pressure medium valve 16a is closed so that pressure medium, for example compressed air, is fed to the pressure medium cylinder 16 and the pressure beam 15 moves downwardly against the lower strand of the grinding band 5 and consequently exerts the necessary grinding pressure. At the same time as the limit switch 26 is actuated, the circuit to the electromagnet 22 will be interrupted so that the pressure roller 23 moves in the direction of the electromagnet 22, and the pressure of the pressure roller 23 acting upon the shifter rod 24 is relieved and the shifter rod 24 drops under its own weight until the trip finger 24a rests on the set screw 27.

The path covered by the shifter rod 24 during this operation is accurately adjustable by the set screw 27. This set screw 27 can be so adjusted that the workpiece 12 covers with its front edge 13 the path from the central vertical plane of the abutment roller 19 to an imaginary line 14 shown in FIG. 3 in exactly the same time in which the shifter rod 24 has moved from its lowermost position into its uppermost position. If the feed speed of the conveyor band 10 and consequently the feed speed of the workpiece 12 is adjusted by the infinitely variable gear 8b which is connected with the rear cylinder 8, the path covered by the front edge 13 of the workpiece 12 from the central vertical plane of the abutment roller 19 to the imaginary line 14 nevertheless remains the same and only the time for covering this path varies according to the adjusted feed speed. As the friction wheel 25 only rotates in accordance with the feed speed of the workpiece 12, the limit switch 26, through the intermediary of the upwardly moving shifter rod 24, will be contacted sooner or later by the approaching trip finger 24a.

When the workpiece 12 has advanced so far that its rear edge 17 is no longer in contact with the abutment roller 19, the abutment roller descends, with the result that the guide rod 19a now closes the circuit for another electromagnet 29 through the intermediary of a contact 28 (FIG. 4). The electromagnet 29 presses a pressure roller 30 against another shifter rod 31 so that this rod bears positively against a friction wheel 32. This friction wheel 32 also rotates according to the rotation of the cylinder 8 through the intermediary of the shaft 25a common for both friction wheels 25 and 32. By the friction wheel 32, the shifter rod 31 is moved upwardly in a simple manner, like the shifter rod 24 by the friction wheel 25, until its trip finger strikes against and actuates the depending plunger of a limit switch 33. Thus the circuit of the pressure medium valve 16a arranged on the upstream side of the pressure medium cylinder 16 is broken. This pressure medium valve is closed and the pressure medium feed to the cylinder 16 interrupted; consequently the pressure beam 15 moves upwardly at the moment when the rear edge 17 of the workpiece 12 has reached another imaginary line 18 shown in FIG. 3. At the same time also the circuit for the electromagnet 29 is broken so that the shifter rod 31 drops under its own weight onto a set screw 34.

These switching stages are completed in a single working operation and the controlling device is again ready for performing another switching operation. The switching stages can be repeated as required. The control of the pressure beam 15 is effected automatically by the workpiece 12, the width of the workpiece being taken directly into consideration, or being immaterial. Briefly in review, it will be noted that pressure application of the beam 15 through the medium of the linkage 15a and power cylinder 16 is in direct relation to the movement of the belt 10 upon which the workpiece 12 is conveyed. The single abutment 19 is operated by the workpiece 12, and the timed operation of the raising and lowering of beam 15 is in direct relation to operation of the roller 8, i.e. shaft 25a. Movement of the beam 15 is timed by the switches 26, 33 to insure complete grinding of the workpiece.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. For instance, instead of a shifter rod 24 with friction wheel 25, a toothed rack with pinion or cam switch wheels can be used if the same function of the make-and-break switching of the different circuits is ensured.

If workpieces in certain operations are moved backwardly and forwardly, the time switch arrangement can be developed accordingly. Then a second abutment roller is provided on the other side of the pressure beam 15 and the time switch arrangement is equipped with an additional shifter rod on the opposite side of the friction wheel.

The above-described controlling device is characterized by its simplicity and reliable operation. A friction wheel controlling device ensures at the same time a particularly gentle control of the pressure beam 15.

I claim:

1. In a belt grinder or the like, a power conveyor means for feeding a workpiece through a path of travel past a work station, tool means at said work station, power means operatively connected to tool means for moving said tool means with respect to said path of travel for engagement with a workpiece on said conveyor means; the improvement comprising a timing switch control device operatively connected to said power conveyor means for operation in relation to operation of said power conveyor means and a workpiece thereon, said timing switch control device including timing switches for sequentially controlling the operative and inoperative positions of said power means for said tool means, and an actuator switch means disposed adjacent the path of travel of said power conveyor means for engaging said workpiece thereon, said actuator switch means including control portions sequentially operating said timing switches of said control device for moving said tool means through a cycle of operation, said timing switch control device including control rod element means operated by said power conveyor for controlling actuation of said switches controlling operation of said tool means, said conveyor comprising a rotatable shaft, said control device comprising rod element means adjacent said rotatable shaft, mechanical coupling means operatively connected to and operated by said actuator switch means for drivingly connecting said rod element means to said rotatable shaft whereby said rod element means is made responsive to movement of said conveyor means shaft.

2. The structure of claim 1 in which said actuator switch means comprises a spring urged abutment element normally positioned in said path of travel of said conveyor means for engaging a workpiece thereon.

3. In a belt grinder or the like, a power conveyor means for feeding a workpiece through a path of travel past a work station, tool means at said work station, power means operatively connected to tool means for moving said tool means with respect to said path of travel for engagement with a workpiece on said conveyor means;

the improvement comprising a timing switch control device operatively connected to said power conveyor means for operation in relation to operation of said power conveyor means and a workpiece thereon, said timing switch control device including timing switches for sequentially controlling the operative and inoperative positions of said power means for said tool means, and an actuator switch means disposed adjacent the path of travel of said power conveyor means for engaging said workpiece thereon, said actuator switch means including control portions sequentially operating said timing switches of said control device for moving said tool means through a cycle of operation, said timing switch control device including control rod element means operated by said power conveyor for controlling actuation of said switches controlling operation of said tool means, said power conveyor means including a rotatable shaft thereon, friction wheel means on said shaft, and pressure-applying means engageable with said rod element means and operated by said actuator switch means for urging said control rod element means into engagement with said friction wheel means.

4. The structure of claim 3 wherein said pressure applying means comprises a plurality of independent magnetically-operated pressure rollers disposed in opposition to said friction wheel means for periodically engaging said rod element means in relation to operation of said conveyor means shaft and operation of said actuator switch means by a workpiece.

5. In a belt grinder or the like, a power conveyor means for feeding a workpiece through a path of travel past a work station, tool means at said work station, power means operatively connected to tool means for moving said tool means with respect to said path of travel for engagement with a workpiece on said conveyor means; the improvement comprising a timing switch control device operatively connected to said power conveyor means for operation in relation to operation of said power conveyor means and a workpiece thereon, said timing switch control device including timing switches for sequentially controlling the operative and inoperative positions of said power means for said tool means, and an actuator switch means disposed adjacent the path of travel of said power conveyor means for engaging said workpiece thereon, said actuator switch means including control portions sequentially operating said timing switches of said control device for moving said tool means through a cycle of operation, said timing switch control device including control rod element means operated by said power conveyor for controlling actuation of said switches controlling operation of said tool means, said control rod element having adjustable positioning means engageable therewith for adjusting the increment of travel before actuation of said switches.

References Cited in the file of this patent
UNITED STATES PATENTS

| | | |
|---|---|---|
| 1,988,577 | Scrimgeour | Jan. 22, 1935 |
| 1,995,382 | Fenton | Mar. 26, 1935 |
| 2,910,809 | Heesemann | Nov. 3, 1959 |
| 2,929,173 | Bergeron | Mar. 22, 1960 |